(12) United States Patent
Trimmer et al.

(10) Patent No.: US 6,851,031 B2
(45) Date of Patent: Feb. 1, 2005

(54) METHOD OF IMPORTING DATA FROM A PHYSICAL DATA STORAGE DEVICE INTO A VIRTUAL TAPE LIBRARY

(75) Inventors: Don Alvin Trimmer, Livermore, CA (US); Roger Keith Stager, Livermore, CA (US); Craig Anthony Johnston, Livermore, CA (US); Yafen Peggy Chang, Fremont, CA (US); Jerry Kai Lau, Livermore, CA (US); Gavin David Cohen, Dublin, CA (US); Rico Blaser, San Francisco, CA (US)

(73) Assignee: Alacritus, Inc., Pleasanton, CA (US)

( * ) Notice: Subject to any disclaimer, the term of this patent is extended or adjusted under 35 U.S.C. 154(b) by 230 days.

(21) Appl. No.: 10/231,988

(22) Filed: Aug. 30, 2002

(65) Prior Publication Data

US 2004/0044863 A1 Mar. 4, 2004

(51) Int. Cl.⁷ .............................................. G06F 12/16
(52) U.S. Cl. ......................... 711/161; 711/111; 711/162
(58) Field of Search ................................ 711/161, 162, 711/111, 114; 709/213, 214, 219; 714/6; 707/204

(56) References Cited

U.S. PATENT DOCUMENTS

| | | |
|---|---|---|
| 4,775,969 A | 10/1988 | Osterlund |
| 5,438,674 A | 8/1995 | Keele et al. |
| 5,455,926 A | 10/1995 | Keele et al. |
| 5,666,538 A | 9/1997 | DeNicola |
| 5,774,292 A | 6/1998 | Georgiou et al. |
| 5,805,864 A | 9/1998 | Carlson et al. |
| 5,809,511 A | 9/1998 | Peake |
| 5,854,720 A | 12/1998 | Shrinkle et al. |
| 5,961,613 A | 10/1999 | DeNicola |
| 5,963,971 A | 10/1999 | Fosler et al. |
| 6,023,709 A | 2/2000 | Anglin et al. |
| 6,029,179 A | 2/2000 | Kishi |
| 6,041,329 A | 3/2000 | Kishi |
| 6,044,442 A | 3/2000 | Jesionowski |
| 6,049,848 A | 4/2000 | Yates et al. |
| 6,070,224 A | 5/2000 | LeCrone et al. |
| 6,098,148 A | 8/2000 | Carlson |
| 6,128,698 A | 10/2000 | Georgis |
| 6,131,142 A | 10/2000 | Kamo et al. |
| 6,173,359 B1 | 1/2001 | Carlson et al. |
| 6,195,730 B1 | 2/2001 | West |
| 6,247,096 B1 | 6/2001 | Fisher et al. |
| 6,260,110 B1 | 7/2001 | LeCrone et al. |
| 6,269,423 B1 | 7/2001 | Kishi |
| 6,282,609 B1 | 8/2001 | Carlson |
| 6,289,425 B1 | 9/2001 | Blendermann et al. |
| 6,304,880 B1 | 10/2001 | Kishi |
| 6,317,814 B1 | 11/2001 | Blendermann et al. |
| 6,324,497 B1 | 11/2001 | Yates et al. |
| 6,327,418 B1 | 12/2001 | Barton |
| 6,336,163 B1 | 1/2002 | Brewer et al. |
| 6,339,778 B1 | 1/2002 | Kishi |
| 6,341,329 B1 | 1/2002 | LeCrone et al. |
| 6,343,342 B1 | 1/2002 | Carlson |
| 6,360,232 B1 | 3/2002 | Brewer et al. |
| 6,389,503 B1 | 5/2002 | Georgis et al. |
| 6,557,073 B1 * | 4/2003 | Fujiwara et al. ............ 711/111 |
| 2003/0014568 A1 * | 1/2003 | Kishi et al. .................... 710/4 |
| 2003/0120676 A1 * | 6/2003 | Holavanahalli et al. ..... 707/102 |
| 2003/0182350 A1 * | 9/2003 | Dewey ........................ 709/100 |
| 2004/0044834 A1 * | 3/2004 | Gibble et al. ................ 711/100 |
| 2004/0044851 A1 * | 3/2004 | Dawson et al. ............. 711/154 |

* cited by examiner

Primary Examiner—Hiep T. Nguyen
(74) Attorney, Agent, or Firm—Volpe and Koenig, P.C.

(57) ABSTRACT

A method of importing a plurality of data from a physical data storage device into a virtual tape library system that is used with a data protection application. The virtual tape library system is usable with an existing data protection application designed for use with a physical tape library without modifying the existing data protection application. The method includes: triggering a signal representing a command to import the plurality of data from the physical data storage device; providing a controller that receives the signal; providing a data storage medium in communication with the controller, the data storage medium has at least one virtual library defined thereon; and copying at least a portion of the plurality of data from the physical data storage device to a virtual tape.

21 Claims, 4 Drawing Sheets

METHOD OF IMPORTING DATA FROM A PHYSICAL DATA STORAGE DEVICE INTO A VIRTUAL TAPE LIBRARY

BACKGROUND

The present invention is directed to a disk based backup storage system that can be seamlessly integrated with a tape backup system or the like and, more specifically, to a method of importing data into a virtual tape library.

Backing up computer data, restoring computer data, securing computer data and managing computer data storage (collectively referred to as data protection) requires complex and disparate technical and operational solutions. Data protection is the single most expensive storage administrative task.

One data protection strategy is to use a redundant array of independent disks (RAID) and disk mirroring technology to protect data. Unfortunately, disk mirroring only prevents data loss in the event of a hardware or power failure. Mirroring does not protect data from human error, such as the accidental deletion of portions of a document. On a disk mirrored system, once data has been deleted from the primary disk, the data is automatically deleted from the mirrored disk and is not retrievable.

To address the problem of human error and computer viral damage, backup systems have been designed that are file-based and track files for many generations. One typical form of data protection backup uses physical tapes to store data in tape libraries. Physical tape backup libraries provide the ability to restore current and historical data and to recover from a variety of forms of data loss.

Referring to FIG. 3, a typical physical tape library 12 is shown. Tape cartridge slots 14 provide storage slots for physical tapes 13. This physical tape library has 40 slots 14 with some of the slots 14 shown containing physical tapes 13. Four tape drives 15 are shown along the bottom of the physical tape library 12 that can be used for reading from, and writing to, the physical tapes 13. Barcode labels 17 are typically used with physical tapes 13 to facilitate automated tape handling and tracking by the data protection application. The physical tapes 13 typically also have a human readable version of the information coded in the barcode to allow manual selection and identification of the physical tapes 13.

A typical physical tape library 12 includes a built in barcode reader which is used to read the barcode labels 17 on the physical tapes 13. Typical data protection applications keep track of data that is backed up on tape 13 by associating the data with a tape 13 having a particular barcode. By including in a barcode reader, the physical tape library can identify a particular physical tape 13.

Physical tape libraries 12 preferably include an entry/exit port 19. The entry/exit port 19 (shown in the upper left hand side of FIG. 3) provides a pathway for tapes 13 to be automatically moved into and out of the physical tape library 12. A tape 13 in the entry/exit port can be accessed by a human operator while the rest of the tapes 13 are secured within the physical library housing. Robotic mechanisms are used to move a tape 13 between the slot 14 and the entry/exit port 19.

To automate the mounting and unmounting of tapes into tape backup drives, many organizations use a robotically-controlled tape library. Actual usage of individual tape media is generally very infrequent. Backup jobs typically run at night during a period called the "backup window". Typically, organizations use tape rotation schemes whereby the organization writes to daily tapes, weekly tapes and monthly tapes. Many of the tapes are sent off-site after being written to, and are not accessed again until either computer data must be restored or the computer data on the backup tape has expired (usually after some number of weeks, months or even years). Additionally, adding to the size of a tape library can be a complicated matter requiring the integration of additional tape libraries into the data protection application.

An essential component of a virtual tape library is its ability to work with removable data storage media. Removable data storage media is essential for offsite archival of data, for freeing up space in the virtual tape library and for interchanging data.

The importation of data into a virtual tape library from physical data storage devices is necessary for a virtual tape library to operate efficiently. Data frequently needs to be imported from removable data storage devices during the following operations: overwriting of the storage media (usually because the storage time has expired and the storage media is scheduled to be overwritten with new backup data); appending data to a preexisting storage media; reading data from the physical storage media; making the contents of the data storage media more reliably available to the data protection application (e.g., while a physical tape is not fault tolerant, a copy of a physical tape maintained in virtual tape library can be fault tolerant); conversion from legacy physical tapes to virtual tapes in preparation for generating new physical tapes using the same (refresh) or different (conversion) tape media type; optionally marking the data storage media as "obsolete" because a new virtual tape of the same name will be created; and the physical tape or a virtual tape of the same name is being marked as bad or obsolete.

Several problems exist when traditional virtual tape library's import data from a storage media. The trigger signals and workflows for various physical tapes are different. Without a virtual tape library, the normal procedure for triggering the importing of data from physical tapes is for the user to query the data protection application to find out the labels of the tape(s) to be imported. With a traditional virtual tape library, the tapes the data protection application writes to are virtual and have different labels from the physical tapes that are tracked by preexisting data protection applications. The typical import procedure must be carried out via the virtual tape library and not the data protection application. Additionally, a physical tape may contain some virtual tapes that a user does not want to import.

A second problem with traditional virtual tape libraries is that they only allow the importation of proprietary tapes. Traditional virtual tape library systems generate physical tapes that are written in the virtual tape library's proprietary format, which can only be read and interpreted by that particular virtual tape library system. The proprietary format adds an additional step in the data importing process. The data from the tape must first be loaded into the virtual tape library system before being passed to the data protection application. More importantly, the proprietary format can not be read by the data protection application unless the virtual tape library system that originally created the tape is still being used at the time the tape is needed. This can create a problem when a tape is required for the restoration of data many years after the tape was created. Thus, virtual tape libraries that use a proprietary format for creating physical tapes can only import tapes that the virtual tape library has written.

Another problem with traditional virtual tape libraries is that the import of data into a virtual tape library can be slow when the import involves the copying of all the tape's data. This process can also be wasteful if all the data is not actually required by a user (for example when the tape is imported to be overwritten).

Clearly, what is needed is a method of importing data from a physical data storage device into a virtual tape library system that preferably does not require that the physical data storage device use proprietary coding and formatting. I would also be preferable that the method incorporate multiple copy modes such as completely copying the data on the physical device, copying a portion of the data on the physical device prior to overwriting the physical device, and operating in a pass-through mode to allow a data protection application to directly read from and/or write to the physical device. Finally it would be preferable that the method is able to import data into a virtual tape library which can replace a physical tape library or act as a cache for a physical tape library for a preexisting data protection application.

SUMMARY

One embodiment of the present invention is directed to a method of importing a plurality of data from a physical data storage device into a virtual tape library system that is used with a data protection application. The virtual tape library system is usable with an existing data protection application designed for use with a physical tape library without modifying the existing data protection application. The method includes: triggering a signal representing a command to import the plurality of data from the physical data storage device; providing a controller that receives the signal; providing a data storage medium in communication with the controller, the data storage medium having at least one virtual library defined thereon, each virtual library being capable of having a plurality of virtual tapes defined therein, the data storage medium being capable of storing the plurality of data in response to signals received by the controller; establishing communication between the data storage medium and the physical data storage device; and copying at least a portion of the plurality of data from the physical data storage device to a virtual tape.

BRIEF DESCRIPTION OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings.

DETAILED DESCRIPTION OF THE PREFERRED EMBODIMENT

The term "data storage medium," as used in the claims and in the corresponding portions of the specification, means "all non-physical tape data storage means including disks, disk subsystems, hard drives, and future developments in disk data storage and other non-volatile forms of storage." The term "physical data storage device," as used in the claims and in the corresponding portions of the specification, means "a media that is removable such as a disk, tape, optical disk, removable drive or the like." The words "a" and "one," as used in the specification and claims is specifically defined to include one or more of the referenced item unless specifically stated otherwise.

Figure 1:
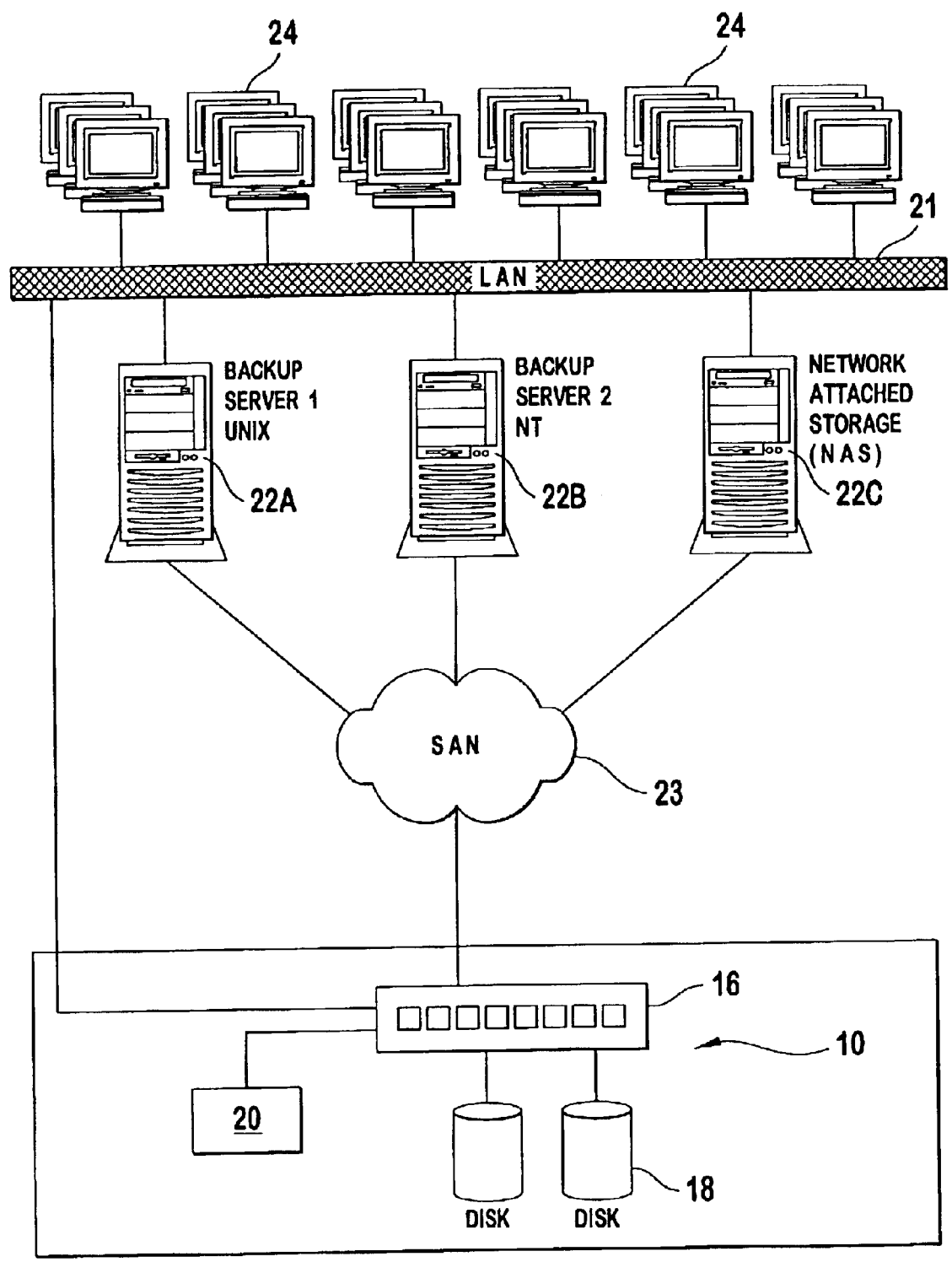
FIG. 1 is a schematic of a virtual library system for importing data from a physical data storage device onto a virtual tape according to the preferred embodiment of the present invention.

Referring to FIG. 1, a preferred system 10 for carrying out the method of importing data from a physical data storage according to the present invention is shown. The system 10 preferably includes a local area network 21 that is in communication with a plurality of servers 22A–22C (shown as three) which support multiple workstations 24. The servers 22A–22C are also interconnected to a shared storage network (which could be local, remote, iSCSI, Fibre Channel, SCSI, etc.) to which the system 10 of the present invention is attached. The system 10 of the present invention preferably incorporates a controller 16, at least one non-tape data storage medium 18, and at least one virtual tape and/or virtual library. As shown in FIG. 1, the system 10 of the present invention preferably entirely replaces physical tape libraries with at least one data storage medium 18 on which at least one virtual tape or virtual library is defined.

One or more virtual libraries are defined on the data storage medium 18, such as a disk subsystem or the like. The sizing, parameters, and organization of the virtual libraries are preferably set to be generally comparable to physical tape libraries. Each virtual library can contain a plurality of virtual tapes, virtual mailboxes, virtual tape slots and virtual tape drives. The virtual tapes are preferably sized and organized to be generally comparable to physical tapes. In contrast with physical tape backup libraries, multiple virtual libraries can be defined on a single data storage medium 18 that can be simultaneously accessed by multiple servers 22A-22C. Those of ordinary skill in the art will appreciate from this disclosure that the method of the present invention is not limited to use with the system 10 shown in FIG. 1, but that the method of the present invention can be used in any known data storage system without departing from the present invention.

Figure 2:
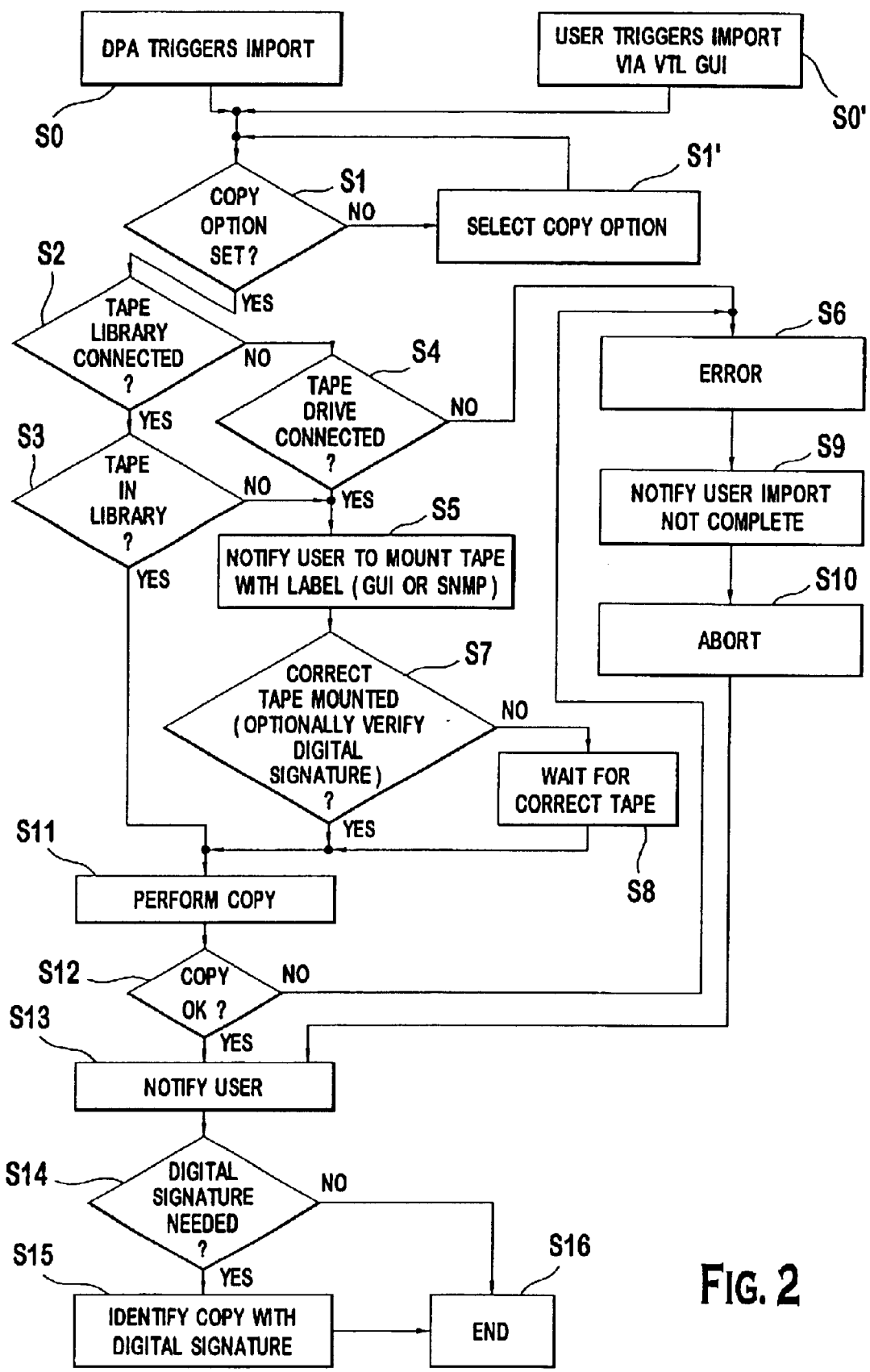
FIG. 2 is a flowchart illustrating the data import process according to the preferred embodiment of the present invention.
Figure 3:
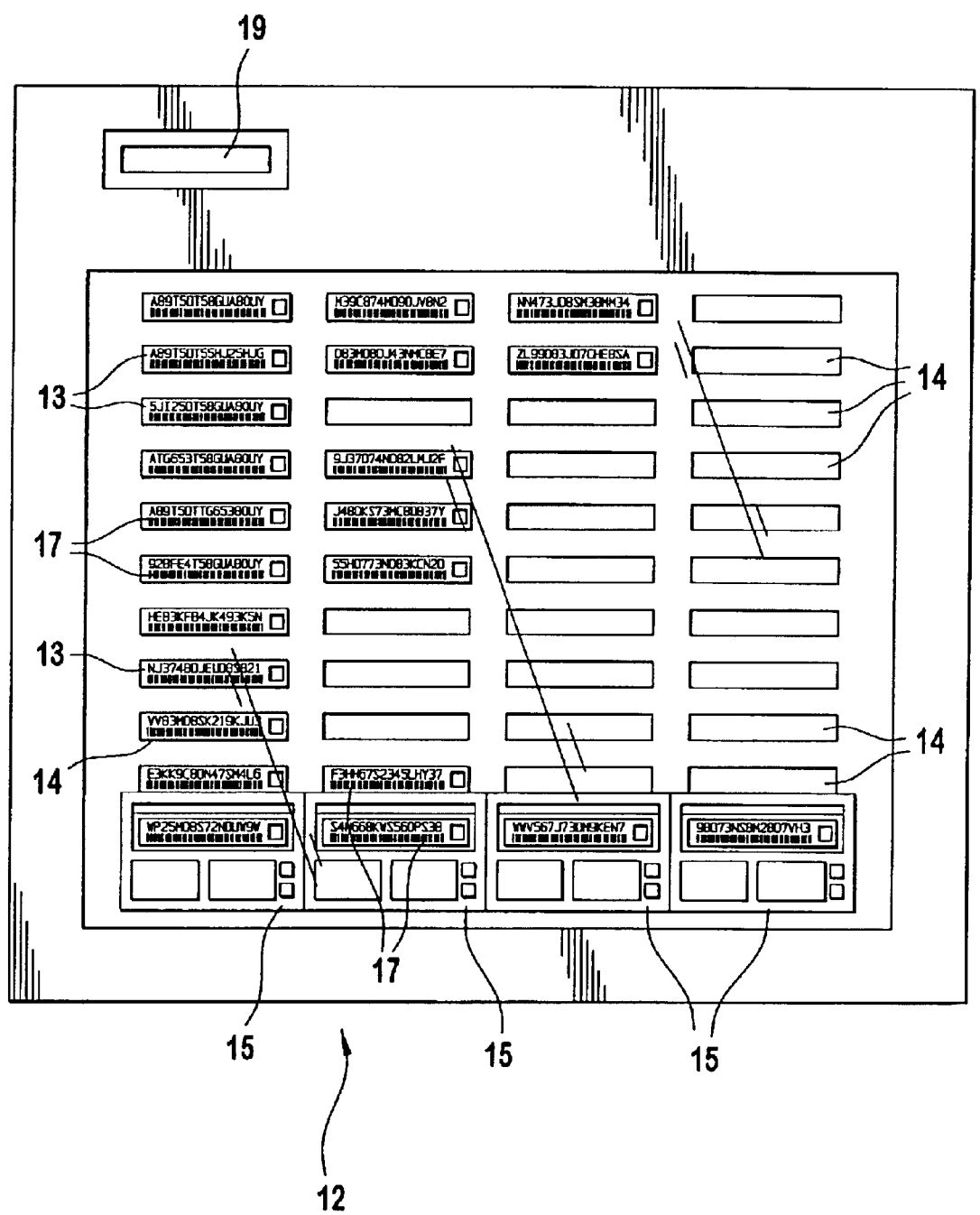
FIG. 3 is schematic of a typical physical tape backup library.

Referring to FIG. 2, one embodiment of the method of importing data according to the present invention is shown. The data is imported from a physical data storage device 20 into the virtual tape library system 10 as follows. It is preferable that the system 10 of the present invention incorporate non-proprietary (open source) code and formatting to facilitate adapting the system 10 to individual data protection applications. The use of open source in the virtual tape and/or virtual library of the present invention eliminates difficulties created by proprietary formatting when data is being restored years after the data was written into a backup file. Those of ordinary skill in the art will appreciate from this disclosure that the system 10 can incorporate proprietary source code without departing from the scope of the present invention.

The method of the present invention is initiated during step S0 when the data protection application requests data from the physical data storage device 20 be imported or can be initiated when a user triggers the import process via a virtual tape library graphical user interface in step S0'. The trigger for the system 10 to import data is seamless so that the virtual tape library can receive commands from a pre-existing data protection application or from a user interface (further described below). The virtual tape library can preferably import data using any combination of copy modes (further described below) that are designed to make the import process as efficient as possible.

If the import is requested by the data protection application during step S0, the virtual tape library intercepts the import command and performs the necessary functions. Thus, the method of the present invention uses a virtual library system 10 that avoids confusing either the user or the data protection application and that optimizes import efficiency. When importing data, the data protection application (DPA) may play a central role in guiding the system 10 through the import process. The data protection application as part of its core function may track the contents of all backup media using barcodes, serial numbers or the like (further described below). Accordingly, the data protection application may be queried to determine which data need to be imported.

When a user manipulates the controls to a data protection application to input into the application particular tape(s) that are to be imported (or the data protection application can initiate this automatically), the data protection application sends signals that would normally instruct a physical tape library to move the desired tapes from the entry/exit port of the physical tape library. The system controller 16 interprets these signals and operates the virtual library and/or virtual tapes to perform the equivalent functions.

If the import is triggered via the user interface during step S0', then the user initiates the import by letting the virtual tape library know the identifying bar code or label used by the physical data storage device 20 containing the data that needs to be imported. In this case, the command that triggers the import of data from the physical data storage device 20 originates directly from the user via the virtual library graphical user interface (GUI). The identifying bar codes or labels used on the physical data storage device 20 are preferably preserved by the virtual tape library by storing digital signatures (i.e., virtual barcodes) that correspond to the physical data storage device 20 in the virtual tape into which the data is imported, which is further described below.

The user interface is preferably styled for manipulating a virtual tape backup library in a manner similar to that used to control a physical tape library. The virtual tape library provided by the system preferably performs the data storage and retrieval functions requested by the user via the user interface. Those of ordinary skill in the art will appreciate from this disclosure that the user interface can be a keypad or the like without departing from the scope of the present invention. The user interface can be displayed on a monitor attached to one of the servers that backs up data to the system 10. Alternatively, the user interface can be located on the Internet for access by a remote controller. This allows the controller to easily manage a number of systems 10 from remote locations. The user interface preferably includes a number of user selectable fields. The user selectable fields can be clickable icons, touch sensitive icons, voice activated subroutines, activated by depressing certain key combinations on a keyboard, or the like. In addition to manipulating the system 10 using the user selectable fields, data can be moved using drag and drop operations in combination with any one of a touch screen, digital pen, track ball, touch pad, and mouse. The use of barcodes (described below) allows a user to manage data via the user interface by selecting data associated with particular barcodes.

After the import process has been triggered in either step S0 or step S0', the system 10 determines whether a copy option is selected during step S1. Prior to beginning the copying portion of the import process, a user can optionally select the type of copy mode to be used. Depending on the copy mode selected, the actual time needed to complete the import can be optimized.

For example, the following copy modes (i.e., copy optimizations) can preferably be selected: complete, overwrite, or pass-through mode. The complete copy mode instructs the virtual tape library to copy substantially all of the data from the physical data storage device 20 into a digitally equivalent virtual tape.

The overwrite copy mode is used to speed up the overwriting process when an expired physical data storage device 20 is to be written over with current data. In this mode, only a portion of data contained on the physical data storage device 20 is imported into the virtual library. The imported data is then used to verify that the correct physical data storage device 20 is engaged with the virtual tape library prior to writing over the data contained therein. This optimization saves an enormous amount of time by eliminating the need to import all of the data into a virtual tape, replace the data contained in the virtual tape, and export all of the data in the virtual tape to the physical data storage device 20. Thus the overwrite copy mode uses the partial import of data to speed up the overwriting process.

The pass-through copy mode allows reads and/or writes to be directly performed between the data protection application and the physical data storage device 20. It is preferably also possible for the virtual tape library to automatically switch from complete mode to pass-through mode if the virtual tape is accessed prior to the completion of a complete data import.

The copy mode can be set by policy, by default, globally or on a case by case basis. An additional option is to have the virtual tape library place the data contained in the physical data storage device 20 in the virtual library's virtual import/export port, which is further described below. This allows the data protection application to use a virtual tape before the copy process is finished. This option increases the efficiency with which the system 10 performs small restores.

If a copy option is not set, then the appropriate selection (e.g., complete, overwrite, or pass-through) is selected during step S1'. Then, in step S2, the system 10 determines whether a tape library is connected to the virtual tape library.

If no tape library is connected, then the system 10 proceeds to step S4, in which the system determines whether a tape drive is connected. If no tape drive is connected, then the system 10 registers an error during step S6. Then, in step S9, the system 10 notifies the user that the import process was not completed. Then, the system 10 aborts the import process during step S10 and notifies a user during step S13.

If the system 10 determines that a tape drive is connected during step S4, then the user is notified that a tape (or other physical data storage device 20) needs to be mounted during step S5. Once the physical data storage device 20 has been mounted, the virtual tape library verifies that the correct tape is mounted.

Once the importation of data is scheduled by the data protection application or by the user, the process of importing data into a virtual tape will depend upon whether there is a physical tape library (or other suitable device for reading from the physical data storage device 20) connected to the virtual tape library with the correct physical tape available (or other physical data storage device). If the correct device for reading information and the correct physical data storage device 20 are already connected to the virtual tape library, then the import process is automated.

Whether the correct physical data storage device 20 is attached is determined using actual barcodes or labels and comparing them to the barcodes or labels requested by the system 10. Virtual tapes that are created from the physical data storage devices 20 preferably preserve the labeling conventions of the physical data storage device 20 (i.e., a readable barcode will be translated to a "virtual barcode" (further described below) and a paper label will be translated to an electronic label).

The virtual barcodes allow the system 10 to monitor virtual tapes in a virtual tape library that can import data stored on a removable physical data storage device 20 into a virtual tape stored in a virtual tape library. The system 10 preferably encodes a virtual barcode in each virtual tape that corresponds to a label used to identify the physical data storage device 20. The virtual barcode can be used by the data protection application to manage and select various virtual tapes in a manner similar to that used by data protection applications using physical tape libraries. The virtual barcodes are preferably digital data that corresponds to the digital data stored in a corresponding actual barcode.

Figure 4:
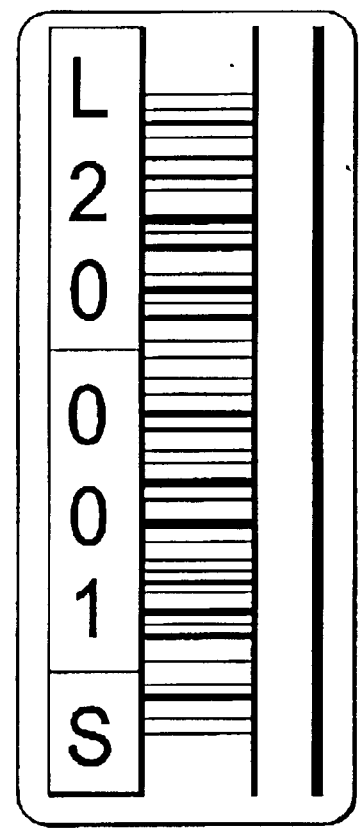
FIGS. 4 and 5 are schematics of actual barcodes that correspond to virtual barcodes used with a virtual tape.
Figure 5:

Referring to FIGS. 4 and 5, two barcodes are shown that correspond to the virtual barcode used with the system of the present invention. These are two examples: a LTO barcode and a Super DLT barcode. The tape library robot uses the bar codes to identify each tape and to move them to the right slots/drives according to the instructions of the backup application. Tape libraries typically implement an "inventory" command that scans all tapes and reports which tapes are in which slots/drives. The letters are only used by human tape operators. We can store corresponding strings: "AB1244L1"/"L20001S" in the same electronic format that the barcodes are encoded. Thus, the system of the present invention can emulate a tape library to: produce the same types of tape movement/management; respond to similar inventory requests (even though there is no physical robot/drive/tape/etc.); and to import/export from and to a physical tape library without introducing any media management issues.

By using virtual barcodes, the system 10 can ensure that virtual tapes are selected that are identical to those physical tapes that the data protection application "thought" it had accessed when it was writing to the virtual tape and/or virtual tape library. When completing the preparation of the virtual tape during the import process, it is preferable that the virtual tape includes the data that was originally stored on a physical tape including the structure, formatting, and/or physical tape label used on the physical tape.

The virtual tapes that are presented to, selected by, managed by, or inventoried by the data protection application are preferably classified using the above mentioned "virtual barcodes." The virtual barcodes are implemented and presented by the virtual tape and/or the virtual tape library in exactly the same manner as a physical tape library incorporates physical barcode labels. This allows the system 10 to select virtual barcodes that will match the physical data storage devices 20 to which the data may eventually be copied.

If the contents of the physical data storage device 20 have previously been stored as a virtual tape within the virtual tape library, then there may already be a copy of the data within the virtual tape library. In this case, the process can be instantaneous and automatic. Once the virtual tape library determines that it already has a copy of the data, the virtual tape library accesses the existing virtual tape and aborts the import process.

Then in step S7, the system 10 determines whether the correct tape is mounted in the tape drive. As mentioned above, this can be determined using barcodes or the like. The method of the present invention is capable of producing virtual tapes that are identical to the physical data storage devices 20 that the preexisting data protection application intended to import. The use of virtual barcodes allows virtual tapes to be created with increased accuracy due to cross-checking procedures that can be implemented prior to importing. The virtual barcodes are selected to be compatible with the physical data storage device 20 from which the data will eventually be copied. When virtual tapes are imported by the system 10, the physical data storage devices 20 can preferably be recycled (i.e., written over). It is preferable that each virtual tape includes a stored digital signature. This digital signature is used by the system 10 to compare the prerecorded digital signature with the digital signature of the physical data storage device 20 prior to recycling the physical data storage device 20. This digital signature matching process prevents the accidental overwriting of data onto a physical data storage device 20 that has not been imported into the system 10.

If an incorrect tape is mounted in the tape drive, then the system 10 waits for the correct tape to be mounted during step S8. If the incorrect physical data storage device 20 is connected to the virtual tape library, manual intervention by the user may be necessary to import a virtual copy of the physical data storage device 20. In general, if manual intervention is required, the user is notified by the virtual library to locate the physical data storage device 20 with the correct label. The user is then notified to place the physical data storage device 20 in an available physical drive (or other device). The virtual tape library then manages the copying of the contents of the physical data storage device 20 to at least one virtual tape while preferably preserving the data's native format. It is preferred that the physical data storage device be any one of a physical tape, a disk, a removable drive, or the like.

Once the correct tape is mounted in the tape drive, the system 10 copies the desired data from the physical data storage device 20 onto a virtual tape during step S11. When the copying takes place, the contents of the physical data storage device 20 including its structure and virtual barcode are preferably copied to the virtual library. This allows the system 10 to import data from a physical data storage device 20 encoded in any format. This also allows one type of physical data storage device 20 to be converted into another type of physical data storage device 20 by importing from one type and exporting to a different type.

When data from a physical data storage device 20 is imported, it will preferably also have a physical label or barcode that matches the virtual barcode that was assigned by the data protection application. Thus, the virtual tape that is created and/or imported by the system 10 is identical to that contained on the physical data storage device 20. It is preferable that the virtual barcode be stored in the header extension of the meta data for each block of data on a data disk.

When the system 10 is preparing to copy in response to receiving a signal from the data protection application, the system 10 preferably schedules creation of a virtual tape. Then, the system 10 preferably moves the desired data from the physical data storage device 20 into a virtual import region. Virtual import regions can also be defined on the data storage medium 18. The virtual import regions provide locations for the placement of data that is to be copied to a virtual tape. This allows the system 10 to mimic the behavior of an actual physical tape library to facilitate seamless integration between the system 10 and the data protection application. This also facilitates the operation of the system in pass-through copy mode.

The system also preferably allows the user to specify (on a global basis, as a default, or on a tape by tape basis) what to do with the data on the physical data storage device 20 once the virtual copy of the physical data storage device 20 has been created in the virtual tape library. For example, the user can have the data on the physical data storage device 20 deleted after being imported.

If during step S2, the system determines that a tape library is connected, then the system checks whether a tape is mounted in the library during step S3. If no tape is detected in the library, then the system 10 advances to step S5 and proceeds as detailed above. If during step S3, the system 10 determines that a tape is in the library, then the system 10 proceeds to step S11 and copies the desired data from the physical data storage device 20 onto the virtual tape.

After the system has copied the desired data, the system 10 determines whether the copy is accurate during step S12. If during step S12, the system determines that the copy is inaccurate or that too much data has been copied, the system proceeds to step S6 and registers an error. After an error is registered in step S6, the system 10 proceeds as detailed above.

If during step S12, the system determines that a copy was accurately made, then the system notifies the user during step S13 that the appropriate data has been imported from the virtual tape library.

Then, during step S14, a user (or the data protection application) can elect to store a digital signature in the virtual tape. If no signature is to be stored, then the import method ends, during step S16. If a digital signature is to be stored, then the signature is stored during step S15 and then, the process ends during step S16.

While FIG. 2 details one method of importing data from a virtual tape library, those of ordinary skill in the art will appreciate from this disclosure that the method shown in FIG. 2 can be varied within the scope of the appended claims or the above description without departing from the scope of the present invention.

The method of the present invention uses a virtual tape library system 10 that can be used with a preexisting data protection application that does not "know" (i.e., that has not been modified from its original configuration which was designed to operate with a physical tape library) that it is backing up to or restoring from the virtual tape library. The virtual tape library preferably allows for the importing of standard (not proprietary) data from a physical data storage device 20. The method of the present invention can be used to replace physical tape libraries with virtual tape libraries while allowing library operators to still use the same physical tape library controls that they are already trained to use.

It is further recognized by those skilled in the art, that changes may be made to the above-described embodiments of the present invention without departing from the broad inventive concept thereof. It is understood, therefore, that this invention is not limited to the particular embodiments disclosed, but is intended to cover all modifications which are within the spirit and scope of the invention as defined by the appended claims

What is claimed is:

1. A method of importing a plurality of data from a physical data storage device into a virtual tape library system that is used with a data protection application, the virtual tape library system being usable with an existing data protection application designed for use with a physical tape library without modifying the existing data protection application, the method comprising:

providing a user interface styled for manipulating a virtual tape library in a manner similar to that used to manipulate a physical tape library, the user interface having a plurality of user selectable fields;

transmitting a signal in response to the manipulation of one of the user selectable fields;

providing a controller that receives the signal;

providing a data storage medium in communication with the controller, the data storage medium having at least one virtual library defined thereon, each virtual library being capable of having a plurality of virtual tapes defined therein, the data storage medium being capable of storing the plurality of data in response to signals received by the controller;

establishing communication between the data storage medium and the physical data storage device; and copying at least a portion of the plurality of data from the physical data storage device to a virtual tape.

2. The method of claim 1, further comprising:

providing the data protection application, the data protection application being in communication with the virtual tape library; and sending the signal at the initiation of the data protection application to the controller.

3. The method of claim 1, wherein the virtual tape library performs data storage and retrieval functions so that a physical tape library can be eliminated for primary backup operations.

4. The method of claim 1, wherein the data storage medium, in combination with the at least one virtual tape library, forms a cache for a physical tape library.

5. The method of claim 1, wherein the step of copying further comprises copying substantially all data contained in the physical data storage device onto a virtual tape.

6. The method of claim 1, wherein the step of copying further comprises:

copying a portion of the plurality of data from the physical data storage device into the virtual tape library;

determining whether the physical data storage device should be overwritten by having the data protection application identify the physical data storage device using the portion of the plurality of data.

7. The method of claim 6, wherein the step of copying further comprises halting the copying process when the portion of the plurality of data can be used to confirm that corresponding data is already present in a virtual tape and/or virtual library.

8. The method of claim 1, wherein the step of copying further comprises interrupting and/or halting the copying to allow the data protection application to directly read from and/or write to the physical data storage device.

9. The method of claim 1, further comprising placing a virtual bar code on the virtual tape that receives the plurality of data from the physical data storage device, the virtual bar code corresponds to a label associated with the physical data storage device.

10. The method of claim 1, wherein the plurality of data is copied to the physical data storage device in a non-proprietary format.

11. The method of claim 1, further comprising stacking a plurality of physical data storage devices, each of the physical data storage devices being stored as a separate virtual tape to increase a number of tapes that the data protection application registers as being contained in a library.

12. The method of claim 1, wherein the copying from the physical data storage device comprises copying from a physical tape.

13. The method of claim 1, wherein the copying from the physical data storage device comprises copying from a removable drive.

14. The method of claim 1, further comprising providing at least one graphical image on the user interface styled to identify a physical data storage device.

15. The method of claim 14, further comprising selecting the plurality of data to import by selecting the at least one graphical image corresponding to the physical data storage device containing the desired data.

16. The method of claim 14, further comprising a user moving or copying the at least a portion of the plurality of data using a drag and drop operation.

17. The method of claim 1, wherein the step of copying further comprises allowing the data protection application to directly read from and/or write to the physical data storage device while other data is being copied from the physical data storage device.

18. The method of claim 1, further comprising tracking the virtual tape containing the portion of the plurality of data to determine whether any data changes are made to the virtual tape.

19. The method of claim 18, further comprising alerting a user when the portion of the plurality of data has been unchanged and is requested for export to a physical data storage device.

20. The method of claim 1, further comprising tracking the physical data storage device from which the portion of the plurality of data was copied to determine whether any data changes are made to the physical data storage device.

21. The method of claim 20, further comprising generating a signal when no data changes to the physical data storage device have been made and a trigger is received to copy the portion of the plurality of data to the physical data storage device.

* * * * *